Patented Apr. 13, 1954

2,675,359

UNITED STATES PATENT OFFICE 2,675,359

WEAKLY BASIC ANION-EXCHANGE RESINS

Henry J. Schneider, Riverside, N. J., assignor to Rohm & Haas Company, Philadelphia, Pa., a corporation of Delaware No Drawing. Application April 14, 1952,
Serial No. 282,275

9 Claims. (Cl. 260—2.1)

This invention relates to anion-exchange resins of the weakly basic type. It also relates to a process of preparing such resins which comprises reacting, by aminolysis, a polyamino compound which contains at least one primary amino group with an insoluble, cross-linked copolymer of an ester of acrylic acid or methacrylic acid.

The products of this invention are unexpectedly stable and durable. They retain their capacity for adsorbing anions over extremely long periods of time, are resistant to attrition, and can even be boiled in dilute aqueous solutions of sodium hydroxide or sulfuric acid without spalling or without loss of anion-exchanging capacity.

The insoluble, cross-linked copolymers which are subsequently subjected to aminolysis to yield the products of this invention are those which contain a preponderant amount of the copolymerized esters of acrylic and methacrylic acids, all of which have the general formula, $$CH_2=CRCOOR'$$

in which R represents a hydrogen atom or a methyl group, and R' represents a monovalent, hydrocarbon radical containing one to eight carbon atoms, preferably an alkyl group. The cross-linked copolymers are made by copolymerizing an ester having the above general formula together with a relatively small amount of a polyvinyl compound, preferably divinylbenzene, which acts as a cross-linking agent and gives rise to a copolymerized product which is three-dimensional and is insoluble in water and in common organic solvents.

Suitable esters of acrylic acid and methacrylic acid include those in which R' represents one of the following typical groups: Methyl, ethyl, isopropyl, isobutyl, tert.-butyl, n-amyl, sec.-amyl, tert.-amyl, n-octyl, 2-ethylhexyl, cyclohexyl, and benzyl groups and the isomers and homologs of the above. It should be kept in mind that the group represented by R' is removed in the form of the corresponding alcohol during the subsequent step of aminolysis; and accordingly it is preferred to employ the cheaper methyl and ethyl esters.

The cross-linking agent which is copolymerized with the esters having the above formula is a polyvinyl compound; i. e., a compound containing a plurality of vinylidene groups of the formula,

The one which is much preferred because it is both effective and readily available is divinyl- benzene. Other suitable, copolymerizable cross-linking agents include the following: Trivinylbenzene, divinyl toluenes, divinyl ethyl benzenes, divinyl xylenes, divinylnaphthalenes, and N,N'-methylene bisacrylamide. The amount of cross-linking agent can be varied widely but, since the total potential capacity of the final anion-exchange resin decreases with an increase in the amount of cross-linking agent, an amount from 3-20%, and preferably from 3-10%, on a molar basis is suggested as being adequate. One percent of the copolymerizable material has been used in the production of anion-exchange resins but it was found that the product swelled objectionably when employed in conventional column-operation.

The mixture of copolymerizable monomers; i. e., the mixtures of esters having the above general formula and the cross-linking agent, is suspended in the form of droplets in a well-stirred aqueous medium and is polymerized therein under the influence of heat and a free-radical catalyst. Such catalysts are well-known and are exemplified by the following which are used in an amount from 0.01-5%, and preferably from 0.02-1%, of the weight of the copolymerizable mixture: Benzoyl peroxide, acetyl peroxide, lauryl peroxide, succinyl peroxide, tert.-butyl hydroperoxide, di-tert.-butyl peroxide, tert.-butyl perbenzoate, stearoyl peroxide, ascaridol, cumene hydroperoxide, caprylyl peroxide, and the like. Temperatures from room temperature (about 15° C.) to the refluxing temperature of the aqueous medium are suitable, especially a temperature of approximately 85° C. The copolymer is thus obtained in the form of small spheroids or beads, the sizes of which can be regulated by the rate of stirring, the use of suspension agents, and the control of temperature. The spheroidal particles are then separated from the aqueous medium, as, for example, by filtration, and are thoroughly washed. While it is much preferred to dry the particles of resin, they can be used in the next step of the process after being simply drained.

Then the cross-linked resinous beads are mixed with a polyamino compound such as is described in greater detail below. In the most satisfactory procedure a large excess of the liquid amino compound is employed so that the reaction mixture is fluid at all times and can be easily stirred. Ordinarily, the amino compound is used in an amount equal to two or three times the weight of the particles of cross-linked, resinous spheroids. Alternatively, a lower amount of amino compound can be used together with an organic liquid such as xylene. But even in such a case it is recommended that a 25–50% excess of amine over the stoichiometrical amount be employed. In general, however, it is much preferred to omit the organic solvent because it interferes with the recovery of any unreacted amino compound and may give rise to the formation of objectionable and troublesome emulsions when the reaction mixture is mixed with water in the step of isolating the final anion-exchange resin.

The reaction between the particles of resin and the amino compound progresses more smoothly if it is conducted under substantially anhydrous conditions. The small amount of water, however, which is present when drained beads of resin are used is not particularly objectionable since it distils during the reaction with some of the amino compound and the alcohol which is liberated during the reaction.

The reaction between the cross-linked resinous ester and the amino compound takes place at a pot temperature above 140° C. This point, 140° C., can be considered the minimum reaction temperature and must be reached or exceeded in order to assure successful results. Temperatures as high as the boiling point of the amino compound or up to depolymerization temperature of the polyester can be used. While the optimal reaction temperature will depend on the particular amine which is used, the overall range of operable temperatures is 140–250° C.

The chemical reaction involved at this point is one of aminolysis. Primary amino groups of the polyamino compounds react with the ester groups of the polyesters and as a result molecules of alcohol are liberated. The alcohols have the general formula R'OH in which R' is identical with the same group in the polyester, as shown above. The alcohol vaporizes and is separated and recovered from the reaction mixture by distillation. Measurement of the amount of liberated alcohol provides a convenient means of following the progress of the reaction.

At the end of the reaction the mixture in the reactor is treated with water. The mixture can be poured into water; but it is much more advantageous to add water slowly to the contents of the reactor. The latter method is much preferred because it does not cause shattering or spalling of the spheroidal particles of the resinous product. The beads of resin are then removed from the mixture of water and unreacted amine and are thoroughly washed with water and/or an alcohol such as methanol or ethanol. The resin is now in a suitable form for use in adsorbing anions from fluids. In commercial production, however, it is recommended that particles of resin be given a thorough washing with dilute mineral acid; e. g., hydrochloric acid, in order to convert them into the salt form, followed by a thorough washing with sodium hydroxide in order to regenerate them completely to the form of the free base.

The excess amino compound is freed of water and is recovered by distillation.

The amino compounds which can be used to make the products of this invention must contain at least two amino groups, at least one of which is a primary amino group. The primary amino groups react with the ester groups in the cross-linked copolymer to form amido groups. These amido groups, however, do not in themselves have anion-adsorbing properties. The groups which do adsorb anions are the other amino groups which are present in the amino compound. These groups can be primary, secondary, or tertiary. Very satisfactory amino compounds include the following: Propylenediamine; imino bispropylamine of the formula $$NH_2-C_3H_6-NH-C_3H_6-NH_2$$

hydroxyethyldiethylenetriamine of the formula $$NH_2-C_2H_4-NH-C_2H_4-NH-C_2H_4-OH$$

N-aminopropylmorpholine, N-aminoethylmorpholine, and dimethylaminopropylamine which are particularly valuable because the resins made from these compounds are easily converted to strongly basic quaternary ammonium anion-exchange resins; diethylenetriamine; triethylenetetramine; tetraethylenepentamine; and the like.

The following examples, in which all parts are by weight, serve to further illustrate the process of this invention and the products thereof.

*Example 1*

A. Into a five-liter, three-necked flask equipped with mechanical stirrer, thermometer, and reflux condenser was charged a solution of 0.15 part of gelatin and 12 parts of a commercial dispersing agent in 2388 parts of water. To this stirred solution was added a mixture of 800 parts of ethyl acrylate, 82 parts of a 55% solution of divinylbenzene in ethylstyrene, and nine parts of benzoyl peroxide. The stirred mixture, containing the droplets of the mixture of copolymerizable materials dispersed in the aqueous medium, was heated to 75° C. and was held at 75–80° C. for four hours. The mixture was then cooled and filtered; and the colorless, transparent, spherical beads of copolymer were thoroughly washed with water and then dried at 110° C. for 16 hours.

B. A mixture of 100 parts of the beads of ethyl acrylate-divinylbenzene copolymer and 300 parts of diethylenetriamine was placed in a reactor equipped with a stirrer, thermometer, and a condenser. The stirred mixture was heated to a pot temperature of 145° C. Ethanol was liberated from the reaction mixture and was removed by distillation. The temperature was gradually raised to 205° C. over a period of 3.5 hours. At the end of this time the beads of resin were filtered off and were thoroughly washed with water and drained. A total of 338 parts of wet resin beads (58% water) was obtained. The beads were clear and pale amber in color. They were tested with dilute hydrochloric acid for anion-exchange capacity and were found to have a capacity of 9.2 milliequivalents per gram (2.6 milliequivalents per milliliter). The wet resin had a density of 42.6 pounds per cubic foot and a column capacity of 47.6 kilograins per cubic foot. When the wet resin was exhausted with dilute hydrochloric acid, the bed volume increased 27.4%.

*Example 2*

To a mixture of 1000 parts of methyl acrylate and 20 parts of a 55% solution of divinylbenzene in ethylstyrene was added a seed of a proliferous copolymer of styrene and butadiene. Nitrogen was bubbled through the mixture in order to flush out oxygen and thereafter the container was sealed and placed in a constant-temperature water-bath maintained at 50° C. By the end of 24 hours the copolymerizable mixture had proliferously polymerized to a porous, sponge-like mass. A portion of this popcorn polymer (200 parts) and 2000 parts of diethylenetriamine were mixed in a reactor equipped with stirrer, thermometer, and condenser. The mixture was heated at 186–201° C. for 3.5 hours, during which time methanol was liberated and distilled. The resin was removed by filtration, was washed free of excess amine and was finally dried at 65° C. for 16 hours. It has a nitrogen-content of 22.1% as against a theoretical value of 25.6% for a resin in which all of the ester groups had been converted to amido groups,

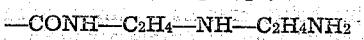

The product had an anion-exchange capacity of 9.1 milliequivalents/gram.

*Example 3*

In the same manner as is described in Example 2 a mixture of 100 parts of the beads of cross-linked ethyl acrylatedivinylbenzene copolymer, prepared by the process of Example 1 above, and 250 parts of triethylenetetramine was heated at 170–248° C. for 5.5 hours during which time 48 parts of distillate was collected. The reaction mixture was cooled in an ice-bath and was then diluted with 500 parts of water. The resin was removed by filtration and was washed thoroughly with water. The product in the form of clear, amber spheroids had an exchange capacity of 10.9 milliequivalents/gram and 2.7 milliequivalents/ml. In column operation the wet resin had a density of 46.7 pounds/cubic foot and a capacity of 36.8 kilograins/cubic foot. When the wet resin was exhausted with dilute hydrochloric acid, the bed volume increased 25.3%.

*Example 4*

Beads of an insoluble, cross-linked copolymer of 95% methyl methacrylate and 5% divinylbenzene were prepared by the process described in step A of Example 1 above. Then 100 parts of these beads and 200 parts of diethylenetriamine were heated and stirred for six hours at a temperature of 157–182° C., according to the process of step B of Example 1. The resinous beads were separated from the reaction mixture and were thoroughly washed. They had an exchange capacity of 6.39 milliequivalents/gram and 2.34 milliequivalents/milliliter.

*Example 5*

One hundred parts of the resinous beads prepared in step A of Example 1 above from ethyl acrylate and divinylbenzene were heated together with 250 parts of 3,3'-iminobispropylamine at 157–210° C. for three hours, after which the resinous product in the form of beads was isolated and washed. This product had an exchange capacity of 7.63 milliequivalents/gram and 2.24 milliequivalents/milliliter. In column operation the resin had a density of 40.8 pounds/cubic foot and a capacity of 40.6 kilograins/cubic foot.

*Example 6*

An anion-exchange resin in the form of spheroids having an exchange capacity of 3.81 milliequivalents/gram was made by the process of Example 5 by heating for five hours at 154–200° C. a mixture of 200 parts of N-(3-aminopropyl)morpholine and 100 parts of the resinous beads obtained by the process of step A of Example 1.

I claim:

1. An insoluble, anion-exchange resin which is the product obtained by reacting at a temperature from 140° C. to 250° C. (a) a cross-linked copolymer of 80–99% on a molar basis of an ester having the general formula $CH_2=CRCOOR'$, in which R is a member of the class consisting of a hydrogen atom and a methyl group and R' is a monovalent hydrocarbon radical containing 1–8 carbon atoms, and 1–20% on a molar basis of a copolymerizable material from the class consisting of divinylbenzene, trivinylbenzene, divinyltoluene, divinylethylbenzene, divinylxylene, divinylnaphthalene and N,N'-methylene bisacrylamide, and (b) a polyamine which contains at least one primary amino group, said polyamine being present during the reaction in a ratio greater than one mole per mole of said ester and said copolymerizable compound in said copolymer.

2. An insoluble, anion-exchange resin which is the product obtained by reacting at a temperature from 140° C. to 250° C. (a) a cross-linked copolymer of 80–99% on a molar basis of an ester having the general formula $CH_2=CRCOOR'$, in which R is a member of the class consisting of a hydrogen atom and a methyl group and R' is a monovalent hydrocarbon radical containing 1–8 carbon atoms, and 1–20% on a molar basis of a copolymerizable material from the class consisting of divinylbenzene, trivinylbenzene, divinyltoluene, divinylethylbenzene, divinylxylene, divinylnaphthalene and N,N'-methylene bisacrylamide, and (b) a polyalkylenepolyamine which contains at least one primary amino group, said polyalkylenepolyamine being present during the reaction in a ratio greater than one mole per mole of said ester and said copolymerizable compound in said copolymer.

3. An insoluble anion-exchange resin which is the product obtained by reacting at a temperature from 140° C. to 250° C. (a) a cross-linked copolymer of 90–97% on a molar basis of an alkyl ester of acrylic acid in which the alkyl group contains 1–8 carbon atoms and 3–10% on a molar basis of divinylbenzene, and (b) a polyalkylenepolyamine, said polyalkylenepolyamine being present during the reaction in a ratio greater than one mole per mole of said ester and said divinylbenzene in said copolymer.

4. An insoluble anion-exchange resin which is the product obtained by reacting at a temperature from 140° C. to 250° C. (a) a cross-linked copolymer of 90–97% on a molar basis of an alkyl ester of methacrylic acid in which the alkyl group contains 1–8 carbon atoms and 3–10% on a molar basis of divinylbenzene, and (b) a polyalkylenepolyamine, said polyalkylenepolyamine being present during the reaction in a ratio greater than one mole per mole of said ester and said divinylbenzene in said copolymer.

5. An insoluble, anion-exchange resin which is the product obtained by reacting at a temperature from 140° C. to 250° C. (a) diethylenetriamine and (b) a cross-linked copolymer of 90–97% on a molar basis of ethyl acrylate and 3–10% on a molar basis of divinylbenzene said amine being present during the reaction in a ratio greater than one mole per mole of ethyl acrylate and divinylbenzene in said copolymer.

6. An insoluble, anion-exchange resin which is the product obtained by reacting at a temperature from 140° C. to 250° C. (a) triethylenetetramine and (b) a cross-linked copolymer of 90–97% on a molar basis of ethyl acrylate and 3–10% on a molar basis of divinylbenzene said amine being present during the reaction in a ratio greater than one mole per mole of ethyl acrylate and divinylbenzene in said copolymer.

7. An insoluble, anion-exchange resin which is the product obtained by reacting at a temperature from 140° C. to 250° C. (a) dimethylaminopropylamine and (b) a cross-linked copolymer of 90-97% on a molar basis of ethyl acrylate and 3-10% on a molar basis of divinylbenzene said amine being present during the reaction in a ratio greater than one mole per mole of ethyl acrylate and divinylbenzene in said copolymer.

8. An insoluble, anion-exchange resin which is the product obtained by reacting at a temperature from 140° C. to 250° C. (a) diethylenetriamine and (b) a cross-linked copolymer of 90-97% on a molar basis of methyl methacrylate and 3-10% on a molar basis of divinylbenzene said amine being present during the reaction in a ratio greater than one mole per mole of methyl methacrylate and divinylbenzene in said copolymer.

9. An insoluble, anion-exchange resin which is the product obtained by reacting at a temperature from 140° C. to 250° C. (a) triethylenetetramine and (b) a cross-linked copolymer of 90-97% on a molar basis of methyl methacrylate and 3-10% on a molar basis of divinylbenzene said amine being present during the reaction in a ratio greater than one mole per mole of methyl methacrylate and divinylbenzene in said copolymer.

References Cited in the file of this patent

UNITED STATES PATENTS

| Number | Name | Date |
|---|---|---|
| 2,582,194 | Dudley | Jan. 8, 1952 |
| 2,597,437 | Bodamer | May 20, 1952 |